US012518742B2

United States Patent
Bruner et al.

(10) Patent No.: US 12,518,742 B2
(45) Date of Patent: Jan. 6, 2026

(54) APPROACHES OF AUGMENTING OUTPUTS FROM SPEECH RECOGNITION

(71) Applicant: Palantir Technologies Inc., Denver, CO (US)

(72) Inventors: Nathan Bruner, Palo Alto, CA (US); Zimei Bian, Palo Alto, CA (US); James Lin, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 301 days.

(21) Appl. No.: 17/741,992

(22) Filed: May 11, 2022

(65) Prior Publication Data

US 2023/0326453 A1 Oct. 12, 2023

Related U.S. Application Data

(60) Provisional application No. 63/329,166, filed on Apr. 8, 2022.

(51) Int. Cl.
*G10L 15/08* (2006.01)
*G06F 40/117* (2020.01)
(Continued)

(52) U.S. Cl.
CPC ............ *G10L 15/08* (2013.01); *G06F 40/117* (2020.01); *G10L 15/04* (2013.01); *G10L 15/22* (2013.01); *G10L 17/02* (2013.01)

(58) Field of Classification Search
CPC ......... G10L 15/08; G10L 15/04; G10L 15/22; G10L 17/02; G06F 40/117
See application file for complete search history.

(56) References Cited

U.S. PATENT DOCUMENTS 6,385,582 B1 5/2002 Iwata
7,155,389 B2 * 12/2006 Belenger ................ G10L 21/06
704/251
(Continued)

FOREIGN PATENT DOCUMENTS

JP 2018-200452 A 12/2018

OTHER PUBLICATIONS

Park, Tae Jin, Naoyuki Kanda, Dimitrios Dimitriadis, Kyu J. Han, Shinji Watanabe, and Shrikanth Narayanan, "A Review of Speaker Diarization: Recent Advances with Deep Learning", Mar. 2022, Computer Speech & Language, vol. 72, pp. 1-34. (Year: 2022).*
(Continued)

*Primary Examiner* — Daniel C Washburn
*Assistant Examiner* — James Boggs
(74) *Attorney, Agent, or Firm* — Sheppard Mullin Richter & Hampton LLP

(57) ABSTRACT

Computing systems methods, and non-transitory storage media are provided for obtaining an audio stream, converting the audio stream to an intermediate representation, performing diarization on the audio stream, separating the audio stream into individual speech constructs, performing speech recognition on the individual speech constructs by mapping each of the individual speech constructs, or consecutive individual speech constructs, to entries within a dictionary, to generate a transcription of the audio stream, generating an output indicative of the transcription and a result of the diarization, transforming the output into an object-based representation, and performing one or more operations on the object-based representation.

19 Claims, 10 Drawing Sheets

(51) Int. Cl.
   *G10L 15/04* (2013.01)
   *G10L 15/22* (2006.01)
   *G10L 17/02* (2013.01)

(56) References Cited

U.S. PATENT DOCUMENTS

| | | | | |
|---|---|---|---|---|
| 7,353,174 | B2* | 4/2008 | Menendez-Pidal | ........................ G10L 15/187 704/256.1 |
| 9,300,790 | B2* | 3/2016 | Gainsboro | .............. G10L 17/00 |
| 9,858,340 | B1* | 1/2018 | Frey | ...................... G10L 15/005 |
| 11,322,148 | B2* | 5/2022 | Yoshioka | .............. H04M 3/568 |
| 11,935,515 | B2* | 3/2024 | Polonov | .................. G10L 21/10 |
| 11,978,456 | B2* | 5/2024 | Medalion | ............. G06V 40/171 |
| 2007/0071206 | A1 | 3/2007 | Gainsboro et al. | |
| 2010/0161337 | A1 | 6/2010 | Pulz et al. | |
| 2016/0179831 | A1* | 6/2016 | Gruber | .................. G10L 19/018 704/235 |
| 2016/0210982 | A1* | 7/2016 | Sherman | ............... G10L 21/003 |
| 2017/0309272 | A1 | 10/2017 | Vanreusel et al. | |
| 2020/0175961 | A1 | 6/2020 | Thomson et al. | |
| 2021/0312901 | A1* | 10/2021 | Relin | ...................... G10L 15/19 |
| 2022/0115020 | A1* | 4/2022 | Bradley | ................. G06F 40/134 |
| 2023/0089308 | A1* | 3/2023 | Wang | ...................... G10L 15/16 704/232 |

OTHER PUBLICATIONS

Sung, Man-Ling, "Unsupervised Spoken Term Discovery on Untranscribed Speech", Nov. 2020, arXiv preprint arXiv: 2011.14060 (Year: 2020).*

Flemotomos, Nikolaos, Zhuohao Chen, David C. Atkins, and Shrikanth Narayanan, "Role Annotated Speech Recognition for Conversational Interactions", Dec. 2018, 2018 IEEE Spoken Language Technology Workshop (SLT 2018), pp. 1036-1043. (Year: 2018).*

Stadelmann, Thilo, Sebastian Glinski-Haefeli, Patrick Gerber, and Oliver Dürr, "Capturing Suprasegmental Features of a Voice with RNNs for Improved Speaker Clustering", Sep. 2018, Artificial Neural Networks in Pattern Recognition: 8th IAPR TC3 Workshop (ANNPR 2018), Proceedings 8, pp. 333-345. (Year: 2018).*

Tur, Gokhan, Andreas Stolcke, Lynn Voss, Stanley Peters, Dilek Hakkani-Tür, John Dowding, Benoit Favre et al., "The CALO Meeting Assistant System", Aug. 2010, IEEE Transactions on Audio, Speech and Language Processing, vol. 18, No. 6, pp. 1601-1611. (Year: 2010).*

Shum, Stephen H., Najim Dehak, Reda Dehak, and James R. Glass, "Unsupervised Methods for Speaker Diarization: An Integrated and Iterative Approach", Oct. 2013, IEEE Transactions on Audio, Speech, and Language Processing, vol. 21, No. 10, pp. 2015-2028. (Year: 2013).*

Partial European Search Report dated Jun. 30, 2023, issued in related European Patent Application No. 23166354.3 (29 pages).

* cited by examiner

APPROACHES OF AUGMENTING OUTPUTS FROM SPEECH RECOGNITION

CROSS REFERENCE TO RELATED APPLICATIONS

This application claims the benefit under 35 U.S.C. § 119(e) of U.S. Provisional Application Ser. No. 63/329,166, filed Apr. 8, 2022, the content of which is incorporated by reference in its entirety into the present disclosure.

FIELD OF THE INVENTION

This disclosure relates to approaches of acquiring an audio or voice-containing stream, diarizing and transcribing or converting the stream including untranscribable utterances, transforming the transcription of the stream into an object-based representation, and further performing one or more downstream operations on or related to the object-based representation. These streamlined approaches implement a single integrated system to acquire, process, and analyze a stream while further augmenting an output from the analyzed or processed stream, such as an object-based representation, with relevant contextual information.

BACKGROUND

Speaker diarization, a component of speech recognition, processing, and analysis, entails partitioning an audio or voice stream (hereinafter "audio stream") into segments corresponding to different individuals. An accuracy of a diarization process is determined by a sum of three different errors: false alarm of speech, missed detection of speech, and confusion between speaker labels. Recent diarization processes have reported error rates as low as 7.6 percent. However, accuracy of speech recognition, at least in certain scenarios, remains deficient. For example, within conversational medical systems, word error rates have been estimated to be between 18 and 63 percent. Within music, word error rates are often over 50 percent. Word error rates are determined by a sum of substitution error, insertion error, and deletion error, divided by a total number of words.

SUMMARY

Various examples of the present disclosure can include computing systems, methods, and non-transitory computer readable media configured to obtain an audio stream, process the audio stream via any of: conversion to an intermediate representation such as a spectrogram, voice activity detection (VAD) or speech activity detection (SAD), diarization, separation of the audio stream into individual speech constructs such as phonemes, and transcription or speech recognition. The speech recognition may include mapping each of the individual speech constructs, or consecutive individual speech constructs, to entries within a dictionary, to generate a transcription of the audio stream. The computing systems, methods, and non-transitory computer readable media may generate an output indicative of the transcription and a result of the diarization, transform the output into a representation such as an object-based representation, and perform one or more operations on the representation. For example, the one or more operations may include an object-based or object-oriented analysis.

In some examples, the performing of speech recognition includes deciphering an untranscribable utterance within the audio stream, wherein the untranscribable utterance comprises slang or a pseudoword that is unrecognizable by the dictionary.

In some examples, the deciphering of the untranscribable utterance includes: determining an other instance having characteristics within a threshold similarity level compared to respective characteristics of the untranscribable utterance, receiving an indication regarding a degree of proximity between the other instance and the untranscribable utterance, and tagging the untranscribable utterance based on the indication.

In some examples, the characteristics include suprasegmentals, the suprasegmentals including a stress, an accent, or a pitch.

In some examples, the performing of the one or more operations includes retrieving additional information stored in a data platform regarding an entity within the output, and rendering a visualization of the additional information.

In some examples, the performing of the one or more operations comprises performing an analysis regarding an entity within the output from additional information stored in a data platform linked to or referencing the entity.

In some examples, the diarization is performed by a machine learning component based on any of variations in length, intensities, consonant-to-vowel ratios, pitch variations, pitch ranges, tempos, articulation rates, and levels of fluency within particular segments of the audio stream.

In some examples, the dictionary is selected based on one or more speaker characteristics, the speaker characteristics comprising any of a level of fluency, a phonetic characteristic, or a region of origin of the speaker.

In some examples, the performing of the one or more operations comprises: ingesting the object-based representation into a data platform and inferring one or more additional links between an entity within the output and one or more additional entities for which information is stored in the data platform.

In some examples, the performing of the one or more operations comprises: receiving a query regarding an entity within the output; retrieving one or more instances, within a data platform connected to the computing system, that references the entity and the query; and generating a response based on the one or more instances.

In some examples, the speech recognition may encompass deciphering or translating (hereinafter "deciphering") untranscribable utterances, segments, or portions (hereinafter "utterances") of the audio stream. For example, untranscribable utterances may include slang, local references, pseudowords, and other undefined terms that are unrecognizable by some dictionaries or databases, such as conventional or universally available dictionaries.

In some examples, the deciphering of untranscribable utterances, and/or the speech recognition in general, may be based on a speaker-specific context. For example, a speaker of the untranscribable utterances, or within the audio stream, may be identified, classified, characterized, or categorized (hereinafter "identified") based on certain attributes such as belonging to a specific region. These attributes may affect pronunciation of words or speech, and therefore, recognition of the speech. Other attributes may include, different speech characteristics, such as intrinsic vowel duration, stop closure duration, local stretch speed, voice onset time, vowel to consonant ratio, tempo, speaking rate, speech rate or articulation rate. Different databases or dictionaries (hereinafter "databases") may correspond to different attributes or combinations thereof. For example, a first database may be grouped according to, or identify, phonetic characteristics, words and/or speech (hereinafter "speech") of a specific regional dialect or accent. A second database may be grouped according to, or identify, phonetic characteristics, words and/or speech of a particular range of vowel to consonant ratios.

In some examples, the deciphering of untranscribable utterances may encompass determining an other instance within the audio stream, or within a different audio stream, that corresponds to the untranscribable utterance. For example, the other instance may have characteristics or parameters (hereinafter "characteristics") within a threshold similarity compared to respective characteristics corresponding to the untranscribable utterance. These characteristics may include phonetic characteristics such as patterns or sequences of speech segments, including vowels and consonants, and/or suprasegmentals including stress or accent, pitch (e.g., tone and/or intonation), and variations in length. Upon determining the other instance, metadata from the other instance may be obtained or extracted. The metadata may include annotations and/or predictions regarding recognized speech of the other instance. The untranscribable utterance may be transcribed or deciphered based on the metadata.

In some examples, the deciphering of untranscribable utterances may encompass receiving an annotation or an indication in response to determining the other instance. The annotation or the indication may be from a user such as an analyst.

In some examples, the deciphering of untranscribable utterances may encompass identifying the speaker as belonging to, the one or more attributes. Different databases may include information regarding untranscribable utterances that correspond to different attributes. This information may encompass mappings of untranscribable utterances to words, and confidence levels thereof. For example, a first database may include information regarding untranscribable utterances of a specific regional dialect or accent. A second database may include information regarding untranscribable utterances of a particular range of vowel to consonant ratios. Therefore, the deciphering of untranscribable utterances may encompass retrieving information, and or one or more mappings, from one or more databases that the speaker is identified as belonging to.

In some examples, the speech recognition may include determining baseline attributes corresponding to a speaker and determining one or more speech segments having emphases within the audio stream according to one or more deviations of attributes corresponding to the speech segments from the baseline attributes.

In some examples, the speech recognition may include detecting different speakers within a common time window and distinguishing respective speech segments from the different speakers.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1 may also be applicable to any of FIGS. 2-9.

DETAILED DESCRIPTION

Figure 1:
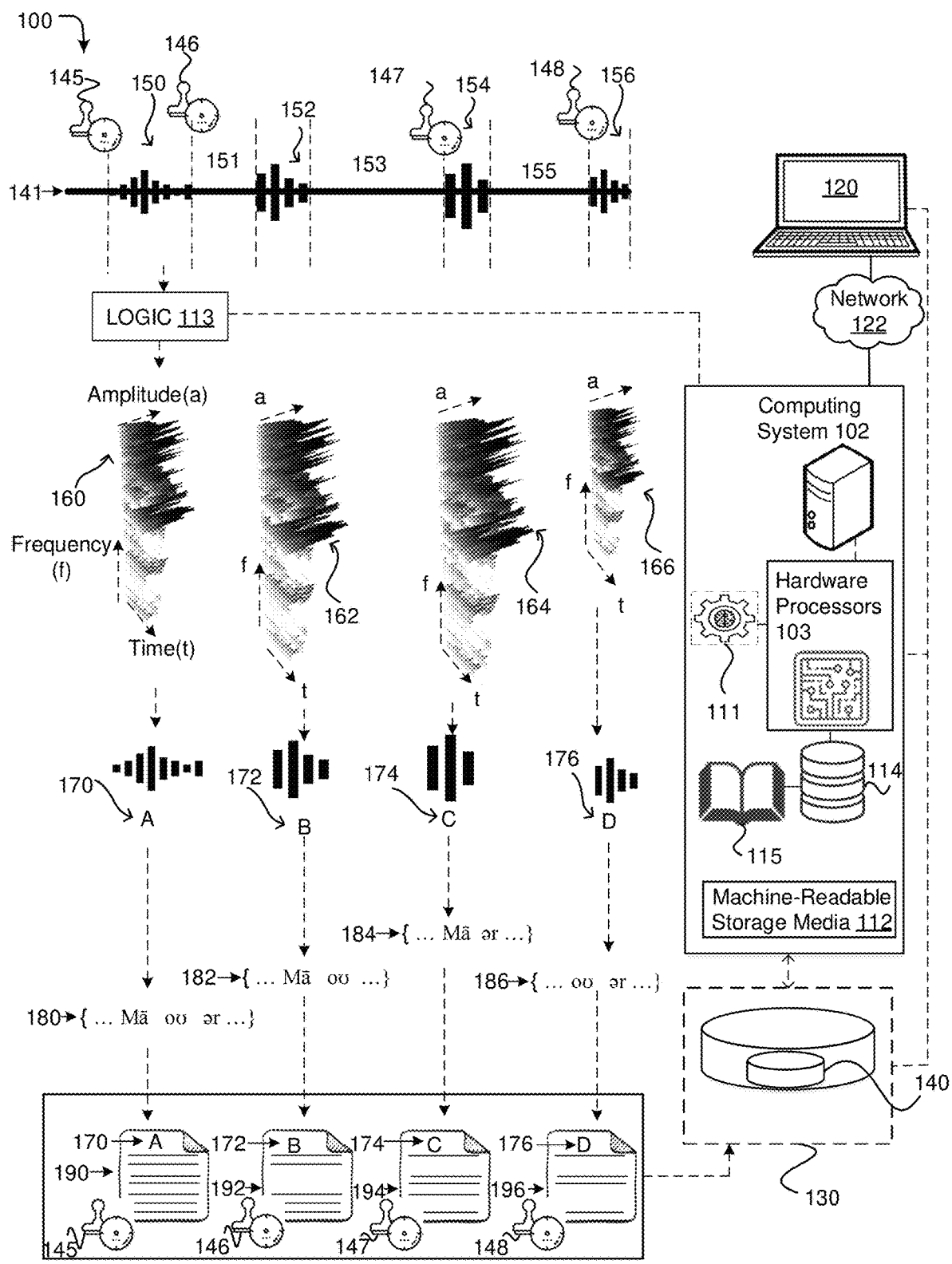
FIG. 1 illustrates an example environment or scenario (hereinafter "environment"), in accordance with various embodiments, of a computing system that obtains and processes an audio stream. The computing system may be an end-to-end system which also is connected or associated with a data platform that further augments a result from the processing of the audio stream.

The prevalence of high error rates in speech recognition is a testament to the current limitations that plague the field. The high error rates may be attributed in part to untranscribable utterances which may be unrecognizable, such as slang, local references, pseudowords, and other undefined terms that are outside of conventional or universally available dictionaries. The problem of addressing untranscribable utterances remains an unfulfilled void. Currently, when systems encounter untranscribable utterances, they generate either an erroneous output or no output at all.

Additionally, speech recognition, processing, and/or analysis is often a stand-alone procedure, meaning that outputs from a speech recognition process are not augmented by, and/or do not augment, further procedures such as analyses. This lack of augmentation stems from current speech recognition tools failing to effectively integration with data platforms and/or other analysis tools and infrastructure, such as object-oriented data platforms that would further ameliorate the outputs of speech recognition tools.

To address these and other shortcomings, a new end-to-end approach resolves untranscribable utterances, among other issues, and augments an output from a speech recognition process with additional procedures or operations. A computing system receives or obtains an audio stream or audio input (hereinafter "audio stream"). The computing system may convert the received audio stream into a different or intermediate representation (hereinafter "intermediate representation") such as a spectrogram. For example, the conversion may entail digitization of the audio stream. The computing system may perform processing on the intermediate representation. The processing may include diarization. For example, diarization may encompass front-end processing such as speech enhancement, dereverberation, speech separation or target speaker extraction, followed by voice or speech activity detection (SAD) to distinguish between speech and non-speech events or activities. SAD may encompass, segmentation, speaker embedding, and/or clustering. Segmentation involves identifying differences in voice characteristics within an audio stream and separating the audio stream into segments. During segmentation, speaker-discriminative embeddings such as speaker factors, I-vectors, or D-vectors may be extracted and clustered. Resegmentation may also be conducted to further refine diarization results by enforcing additional constraints.

The segments corresponding to speech may be transformed to acoustic features or constructs, or embedding vectors. Following transformation, the resulting portions may be clustered by individual speakers or speaker classes, resolved or mapped to timestamps, and further refined. Certain segments may be identified as having common speakers during embedding.

Within each of the segments, the computing system may identify or determine individual phonemes, and/or phoneme streams which include a combination of consecutive or adjacent phonemes. In some examples, the phoneme streams may include approximate or estimated words or phrases, which may be searchable within the audio stream, a different audio stream, and/or a dictionary to decipher and/or further elucidate their context. The computing system may determine or estimate probabilities that each of the resulting portions, or combinations thereof, corresponds to a particular entry in a database or dictionary. Each entry in a database or dictionary may indicate a word, phrase, and/or other speech construct. In such a manner, the computing system may transform an audio stream into a textual output. This textual output may be further converted into an alternative representation, such as an object-based representation, in order to facilitate further operations thereon that augment the textual output and/or provide augmentation to or supplement other information.

Specifically, the computing system addresses untranscribable utterances by searching for one or more other instances corresponding to the untranscribable utterances either within the audio stream or within a different audio stream. For example, the untranscribable utterances may constitute, or be part of, a phoneme stream. The other instances may have phonetic characteristics that match (e.g., to a threshold similarity level) respective phonetic characteristics of or surrounding the untranscribable utterances. These characteristics may include phonetic characteristics such as patterns or sequences of speech segments, including vowels and consonants, and/or suprasegmentals including stress or accent, pitch (e.g., tone and/or intonation), and variations in length. Upon determining the other instances, the computing system may augment the untranscribable utterances using metadata and/or other information associated with the other instances. For example, the computing system may predict a result of the untranscribable utterances based on one or more predictions associated with the other instances. Alternatively or additionally, the computing system may predict a result of the untranscribable utterances based on one or more annotations associated with the other instances. For example, the other instances may have annotations that indicate which word or phrase the other instances correspond to. These features, among others, will be addressed with respect to the foregoing FIGS. 1-9.

FIG. 1 illustrates an example environment 100, in accordance with various embodiments, of an end-to-end computing system that obtains and processes an audio stream. The example environment 100 can include at least a computing system 102 and at least one computing device 120. In general, the computing device 120 may be operated by an entity such as a user. The user may submit a request or query through the computing device 120. In some examples, the user may be an administrative user that provides annotations, feedback, or modifications to any of the outputs, inputs, and/or intermediate results generated from the computing system 102. In some examples, the computing device 120 may visually render any outputs generated from the computing system 102. In general, the user can interact with the computing system 102 directly or over a network 122, for example, through one or more graphical user interfaces and/or application programming interfaces.

The computing system 102 and the computing device 120 may each include one or more processors and memory. Processors can be configured to perform various operations by interpreting machine-readable instructions, for example, from a machine-readable storage media 112. The processors can include one or more hardware processors 103 of the computing system 102.

The computing system 102 may be connected to or associated with one or more data sources or data platforms (hereinafter "data platforms" 130). The data platforms 130 may include, or be capable of obtaining from other sources, additional information that may augment results of speech recognition outputs and/or be augmented by the speech recognition outputs. For example, the additional information may include objects and/or attributes thereof related or referred to by the speech recognition outputs. The additional information may thus further elucidate, contextualize and supplement, and/or be elucidated, contextualized and supplemented by, the speech recognition outputs. By linking the data platforms 130 to the speech recognition outputs, the additional information can thus seamlessly synchronized to the speech recognition outputs within a single centralized location. Therefore, the additional information along with tools to harness and leverage the additional information does not need to be separately ingested or obtained, thereby conserving time and computing resources. This synchronization constitutes a technical effect.

The data platforms 130 may be divided into at least one segment 140. Although one segment 140 is shown for purposes of simplicity, the data platforms 130 may be understood to include multiple segments. As an example, one segment may include, and/or store additional information related to, person objects or a specific subset or category thereof. Therefore, each segment may be particularly tailored to or restricted to storage and management of resources having a particular purpose and/or of a particular subject matter. Such segregation of resources in different segments may be desirable in scenarios in which access to, dissemination, and/or release of resources from one source are to be determined and managed separately from those resources from other sources, and only specific users may have access to one or more particular segments of resources.

Additionally or alternatively, the data platforms 130 may be divided into multiple segments in order to sequester access to particular information based on access control levels or privileges of each of the segments. For example, each segment may be, or be labelled as, accessible only by persons (e.g., users operating the computing device 120) having one or more particular access control levels or privileges. The demarcation of information within the data platforms 130 into segments, such as the segment 140, provides clear delineations, classification levels and/or access constraints of each of the segments. As an example, one segment may have a classification level of "confidential," while another segment may have a classification level of "top secret." A classification level of a segment may indicate or define a maximum classification level of information or resources that are permitted within the segment. In particular, if one segment has a classification level of "confidential," then information or resources classified up to and including, or, at or below a level of, "confidential" may be permitted to be ingested into the segment while information or resources classified at a level higher than "confidential" may be blocked or restricted from being ingested into the segment. In some examples, the classification levels may be inherited or transferred from already defined classification levels of the external sources. In some examples, the classification levels may be automatically or manually set.

The hardware processors 103 may further be connected to, include, or be embedded with logic 113 which, for example, may include protocol that is executed to carry out the functions of the hardware processors 103. The hardware processors 103 may also include or be associated with one or more machine learning components or models (hereinafter "machine learning components") 111. The machine learning components 111 may perform any relevant machine learning functions by generating one or more outputs indicative of results or predictions. These machine learning functions can include, or be involved in, diarization, speech recognition and/or transcription. Specifically, the machine learning functions may entail deciphering untranscribable utterances. In some examples, machine learning functions of the machine learning components 111 may be embedded within or incorporated within the logic 113.

In general, the logic 113 may be implemented, in whole or in part, as software that is capable of running on one or more computing devices (e.g., the computing device 120) or systems such as the hardware processors 103, and may be read or executed from the machine-readable storage media 112. In one example, the logic 113 may be implemented as or within a software application running on one or more computing devices (e.g., user or client devices such as the computing device 120) and/or one or more servers (e.g., network servers or cloud servers). The logic 113 may, as alluded to above, perform functions of, for example, obtaining or receiving an audio stream, generating an intermediate representation from the audio stream, processing the intermediate representation and/or the audio stream, and generating an output indicative of a speech recognition result. This output may include identification of different speakers, distinguishing speech from non-speech events or activities, and transcription of the audio stream.

Additionally, the logic 113 may receive an input, request, or query (hereinafter "input"), for example from the computing device 120, and analyze or evaluate the input. The logic 113 may generate an output or response to the input or query, which provides information and/or a visualization, and or perform a particular action such as changing a visualization and/or analysis protocol or procedure, based on the input or query.

Meanwhile, the logic 113 may determine or ensure that the input 140 is proper and conforms to the constraints and/or classification levels. For example, if the input requires access to a particular resource, or a particular segment thereof, the logic 113 may ensure that access to a particular resource would conform to the constraints and/or classification levels for the user and based on a comparison of the constraints and/or classification levels of the particular segment. The logic 113 may ensure that a user requesting access to or ingestion of a resource belonging to a particular segment has appropriate permissions, such as access or editing permissions, or authorization on that resource. If not, the logic 113 may redact a portion of the resources that exceed or violate the constraints and/or classification levels for the user. In another exemplary manifestation, the logic 113 may determine whether, and/or to what degree, a user requesting access to a particular resource is actually authorized to do so. For example, the logic 113 may determine that even though a user satisfies a clearance level corresponding to a classification of a particular segment, the user may not satisfy a dissemination or release control. The logic 113 may implement restrictions such as prohibiting the user from viewing or editing contents of resources within the segment 140, prohibiting the user from viewing an existence of resources within the segment 140, and/or generating tearlines to purge contents of resource portions that fail to satisfy a dissemination or release control.

In some embodiments, the computing system 102 may further include a database or other storage (hereinafter "database") 114 associated with the hardware processors 103. In some embodiments, the database 114 may be integrated internally with the hardware processors 103. In other embodiments, the database 114 may be separate from but communicatively connected to the hardware processors 103. Furthermore, the database 114 may be integrated with, or alternatively, spatially separated from, the data platforms 130. The database 114 may store information such as the results from the one or more machine learning models 111, and/or the speech recognition outputs. In some instances, one or more of the hardware processors 103 may be combined or integrated into a single processor, and some or all functions performed by one or more of the hardware processors 103 may not be spatially separated, but instead may be performed by a common processor.

As illustrated in FIG. 1, the logic 113 may perform an exemplary operation of obtaining and processing an audio stream 141. The audio stream 141 may be manifested in any applicable format such as compressed or uncompressed. Applicable formats may more specifically include, Moving Pictures Experts Group Layer-3 (MP3), Advanced Audio Coding (AAC), Waveform Audio File Format (WAV), Audio Interchange File Format (AIFF), AUdio (AU), raw headerless PCM (Pulse Code Modulation), and Free Lossless Audio Codec (FLAC), to name some examples. In some examples, the audio stream 141 may be from another media format, such as a video file. The logic 113 may obtain the audio stream 141 via one or more processes or from one or more application programming interfaces (APIs). The audio stream 141 may include segments 150, 151, 152, 153, 154, 155, and 156. As will be explained regarding diarization, the segments 150, 152, 154, and 156 may be identified as having speech activity or including speech events whereas the segments 151, 153, and 155 may be identified as being devoid of speech activity or speech events. Timestamps 145, 146, 147, and 148 may mark respective onsets, or beginnings, of the segments 150, 152, 154, and 156. Additionally or alternatively, the timestamps 145, 146, 147, and 148 may indicate ending times and/or durations of the segments 150, 152, 154, and 156. These timestamps 145, 146, 147, and 148 may be part of, or integrated within, an output of the speech recognition process to indicate times corresponding to each speaker.

The logic 113 may further generate an intermediate representation, such as a spectrogram, from the audio stream 141. The spectrogram may include portions 160, 162, 164, and 166 corresponding to the segments 150, 152, 154, and 156. The spectrogram may have three dimensions, such as time, frequency, and amplitude at response time-frequency pairs. The spectrogram may facilitate further processing of the audio stream 141. From the spectrogram and/or the audio stream 141, the logic 113 may classify speech and non-speech portions of the audio stream 141. The logic may perform diarization in order to identify speakers associated with each segment that has been classified as speech. In particular, the logic 113 may output an identification 170 that speaker A is associated with the segment 150, an identification 172 that speaker B is associated with the segment 152, an identification 174 that speaker C is associated with the segment 154, and an identification 176 that speaker D is associated with the segment 156. In alternative examples, certain segments may be identified as being associated with common speakers. For example, the segments 150 and 156 may be associated with a same speaker. In order to perform diarization, the logic 113 may extract features belonging to each of the speakers. During diarization, the logic 113 may perform any of an i-vector or x-vector analysis, a mel-frequency cepstral coefficients (MFCC), or a cepstral-mean and variance normalization (CMVN).

The diarization may involve machine learning components 111 recognizing different speakers and a particular speaker corresponding to each of the segments 152, 154, 156, and 158, based on similarities and/or differences between characteristics of speech of a current speaker and previous speakers, within the same audio stream 141 or a different audio stream. These characteristics may include, without limitation, any of phonetic characteristics such as patterns or sequences of speech segments, including vowels and consonants, and/or suprasegmentals including stress or accent, pitch (e.g., tone and/or intonation), variations in length, intensities, consonant-to-vowel ratios, pitch variations, pitch ranges, tempo, speaking rate, speech rate, articulation rate, level of fluency as indicated by frequency or amount of repetitions, corrections, or hesitations, phonetic variations such as exploding certain sounds, vowel durations, stop closure durations, voice onset times, accents, tonalities, rhythmic variations, and/or other speech patterns or characteristics.

The one or more machine learning components 111 may be trained to determine one or more weights corresponding to the aforementioned characteristics. The training may encompass supervised training, in which at least a subset of training data includes speaker information such as identifying characteristics corresponding to specific voice segments. The voice segments may be provided as input and the one or more machine learning components 111 can adjust the one or more weights based on the corresponding speaker information. Additionally or alternatively, the training may encompass using at least two subsets of training data sequentially or in parallel. A first subset of training data may include scenarios in which two speakers are resolved or determined as common speakers. A second subset of training data may include scenarios in which two speakers are resolved or determined as different speakers. Alternatively or additionally, an additional subset (e.g., a third subset of training data) may include scenarios that the machine learning components 111 incorrectly inferred, determined, or predicted, or scenarios having threshold similarities to the examples that were incorrectly inferred by the machine learning components 111. In such a manner, the machine learning component 111 may be improved by retraining on examples in which the machine learning component 111 performed worst. Another aspect of training may be feedback, for example provided by a user such as a user of the computing device 120, regarding outputs from the machine learning components 111 while the machine learning components 111 are actually operating.

The logic 113 may extract or obtain, from the audio stream 141 or from the spectrogram, individual units of sound such as phonemes, graphemes, or morphemes. As a non-limiting example, in FIG. 1, the logic 113 may obtain phonemes or combinations thereof such as phoneme streams (hereinafter "phoneme streams") 180, 182, 184, and 186 corresponding to the segments 150, 152, 154, and 156. The phoneme streams 180, 182, 184, and 186 may include combinations of consecutive or successive phonemes, in which each of the combinations constitute approximate words or phrases. The phoneme streams 180, 182, 184, and 186 may be searched, using a dictionary or lexicon 115 (hereinafter "dictionary"), and/or within the audio stream 141, or within a different audio stream 141 to determine potential matches and/or further contextualize the phoneme streams 180, 182, 184, and 186. The dictionary 115 may, in some examples, be stored in or associated with the database 114, or otherwise associated with the computing system 102. In some examples, the dictionary 115 may be from an external source. The logic 113 may map phonemes, and/or combinations thereof, into particular entries of the dictionary 115, and determine probabilities and/or confidence levels of matches. In some examples, the logic 113 may output one or more words or other speech constructs within the dictionary 115 that corresponds to at least a threshold probability and/or confidence level. In some examples, the logic 113 may output a word or speech construct that corresponds to a highest probability and/or confidence level, compared to other words, for example, using an argmax operation. The logic 113 may output a transcription of the entire audio stream 141, and/or of entire portions thereof. For example, the logic 113 may generate an output 190 that includes a transcription of all detected words or speech within the segment 150. Similarly, outputs 192, 194, and 196 correspond to transcriptions within the segments 152, 154, and 156, respectively. The outputs 190, 192, 194, and 196 may further include the respective identifications of speakers 170, 172, 174, and 176, respectively, and/or the timestamps 145, 146, 147, and 148, respectively. In some examples, the logic 113 may generate the transcriptions before, instead of after, the diarization, or at least partially in parallel with the diarization. The logic 113 may further ingest the outputs 190 into the data platforms 130. As will be described with reference to FIG. 2, the outputs 190, 192, 194, and 196 may be converted, transformed, or merged or incorporated with other information into an object-based or object-oriented representation or format prior to ingestion.

Figure 2:
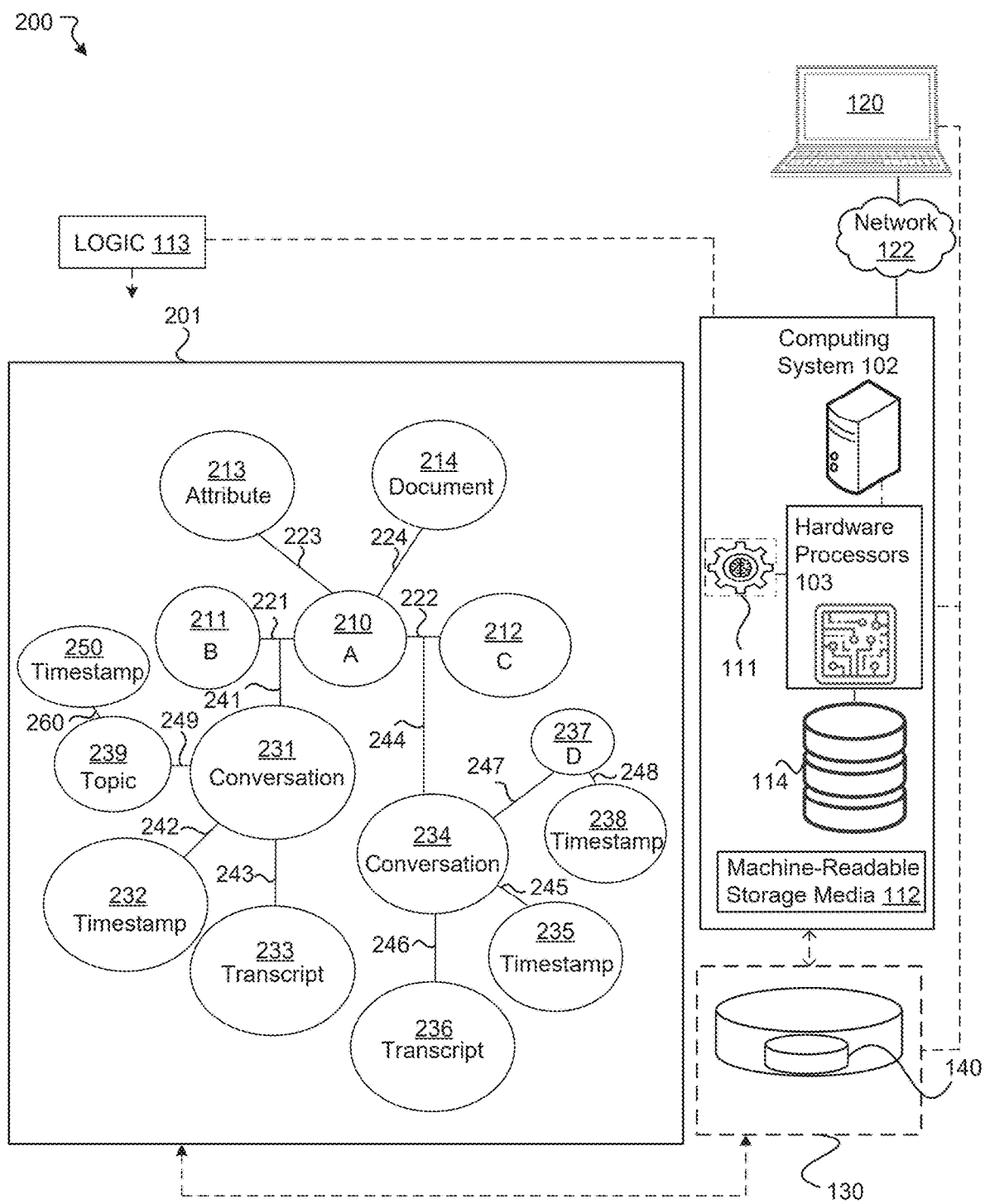
FIG. 2 illustrates, in accordance with various embodiments, exemplary operations of generating an object-based or object-oriented representation or format of a result from the process illustrated in FIG. 1.

FIG. 2 illustrates an environment 200, in which the logic 113 transforms or merges the outputs 190, 192, 194, and 196 into an object-based or object-oriented representation or format (hereinafter "object-based representation") 201. In particular, the object-based representation 201 may include an object 210 representing speaker A, corresponding to, for example, the identification 170. The object 210 may be linked to an object 211 that represents speaker B, corresponding to, for example, the identification 172. A link 221 between the object 210 and the object 211 may indicate a "communicates with" or "has corresponded with" relationship between entities (e.g., speakers A and B) represented by the object 210 and the object 211. The object 210 may also be linked to an object 212 that represents speaker C, corresponding to, for example, the identification 174. A link 222 between the object 210 and the object 212 may indicate a "communicates with" or "has corresponded with" relationship between entities (e.g., speakers A and C) represented by the object 210 and the object 212. The object 210 may also be linked to an attribute 213, which may include any characteristic of an entity (e.g., speaker A), such as a role, a position, or title, to name some non-limiting examples. A link 223 between the object 210 and the attribute 213 may indicate an "attribute of" relationship between an entity (e.g., speaker A) represented by the object 210 and the attribute 213. The object 210 may also be linked to an object 214 representing a document, such as, a document written or authored by speaker A, or otherwise associated with speaker A. For example, a link 224 may indicate an "author of" relationship between speaker A and the document.

The object 210 and the object 211 may further be linked to an object 231 representing a first conversation between speaker A and speaker B. A link 241 may indicate a "conversation occurred" relationship between the first conversation represented by the object 231, and speakers A and B. The object 231 may be linked to an object 232 representing a timestamp indicating any of a start time, an end time, and/or a duration of the first conversation. A link 242 may indicate a "time of" relationship between the timestamp and the first conversation. Meanwhile, the object 231 may be linked to an object 233 representing a transcript of the first conversation. The transcript may include an output from FIG. 1, such as the output 190, the output 192, and/or an other relevant outputs from the audio stream 141. A link 243 may indicate a "transcript of" or "translation of" relationship between the transcript and the first conversation. The object 231 may also be linked to an object 239 representing a topic or subject of the first conversation. A link 249 may indicate a "referenced in" relationship between the topic and the first conversation. The object 239 may be linked, via a link 260, to an object 250 representing a timestamp, at which the topic was mentioned or referenced.

The object 210 and the object 212 may further be linked to an object 234 representing a second conversation between speaker A and speaker C. A link 244 may indicate a "conversation occurred" relationship between the second conversation represented by the object 234, and speakers A and C. The object 234 may be linked to an object 235 representing a timestamp indicating any of a start time, an end time, and/or a duration of the second conversation. A link 245 may indicate a "time of" relationship between the timestamp and the second conversation. Meanwhile, the object 234 may be linked to an object 236 representing a transcript of the second conversation. The transcript may include an output from FIG. 1, such as the output 194, and/or an other relevant outputs from the audio stream 141. A link 246 may indicate a "transcript of" or "translation of" relationship between the transcript and the second conversation. The object 234 may further be linked to an object 237 representing a entity or person D, which may have been mentioned or referenced within the second conversation. A link 247 may indicate a "referenced by" or "mentioned by" relationship between the conversation and the person D. Although not shown, the object 237 may further be linked, via a link 248, to a timestamp 238 indicating a time that person D was referenced or mentioned. The link 248 may indicate a "time of" relationship between the person D and the second conversation.

The logic 113 may ingest or transmit the object-based representation 201 into the data platforms 130. Because the data platforms 130 may specifically be compatible with object-based representations of data, the object-based representation 201 may not require further processing to render it compatible with the data platforms 130. Once ingested into the data platforms 130, the object-based representation 201 may be further augmented by information within the data platforms 130, and/or further augment information within the data platforms 130. For example, the object-based representation 201 may be further expanded to incorporate additional objects, attributes, and/or links from the data within the platforms 130. Therefore, integrating the results of a speech recognition process with a data platform results in a cornucopia of benefits and new possibilities.

Figure 3:
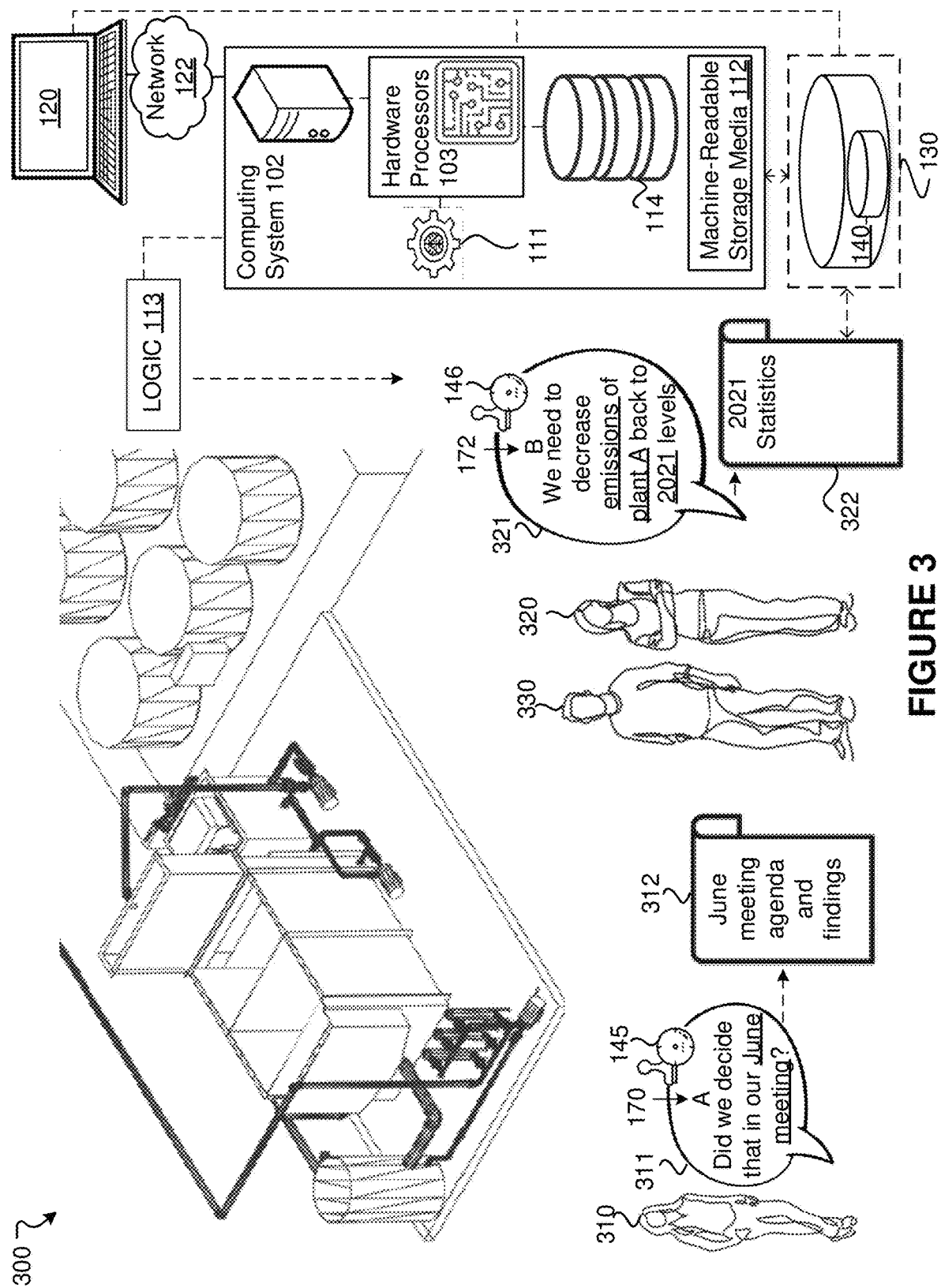
FIG. 3 illustrates, in accordance with various embodiments, an exemplary video captioning scenario and augmenting of a result from a speech recognition process.

FIG. 3 illustrates an environment 300, depicting a video captioning scenario and augmenting of a result (e.g., any of the outputs 190, 192, 194, and 196) from a speech recognition process. FIG. 3 illustrates one benefit due to ingesting of the result into the platforms 130. The environment 300 may be generated and/or visualized, for example, on a display of the computing device 120. In particular, from diarization, entities or persons (hereinafter "persons") 310 and 320 may be identified as speakers while person 330 may be identified as not having spoken. For example, the persons 310 and 320 may correspond to the speakers A and B in FIGS. 1 and 2.

The environment 300 depicts a plant, such as a manufacturing plant or facility, as merely a non-limiting example. Any other settings may also be applicable. In FIG. 3, a video within the plant may include captions 311 and 321 for persons 310 and 321, respectively. For example, captions 311 and 321 may correspond to, or include, transcripts from the outputs 190 and 192, respectively, from FIG. 1. The caption 311 may include an identification, such as the identification 170 to associate the speaker A with the output 190. The caption 311 may, additionally or alternatively, include the timestamp 145. Meanwhile, the caption 321 may include an identification, such as the identification 172 to associate the speaker B with the output 192. The caption 321 may, additionally or alternatively, include the timestamp 146.

As a result of ingestion of the outputs from FIG. 1 into the data platforms 130, relevant transcribed speech may be linked to additional information within the data platforms, which may further contextualize the speech. For example, when the person 310 refers to a "June meeting," the logic 113 may obtain or extract, from relevant portions of the data platforms 130, any references or links to the "June meeting." These may encompass a document 312 regarding the June meeting, and/or any other text, media, or unstructured files regarding or relevant to the June meeting. These references or links may be visualized or populated either automatically or upon the logic 113 receiving a selection, such as a click or a drag, on the "June meeting." Likewise, when the person 320 refers to "emissions," "plant A" or "2021 levels," the logic 113 may obtain or extract, from relevant portions of the data platforms 130, any relevant references or links. For example, these may encompass a document 322 regarding 2021 statistics, and/or any other text, media, or unstructured files regarding or relevant to "2021 levels." In this manner, seamless integration between outputs of speech recognition and a data platform may expand the horizons of speech recognition output by enriching the contextualization of the speech recognition output.

Figure 4:
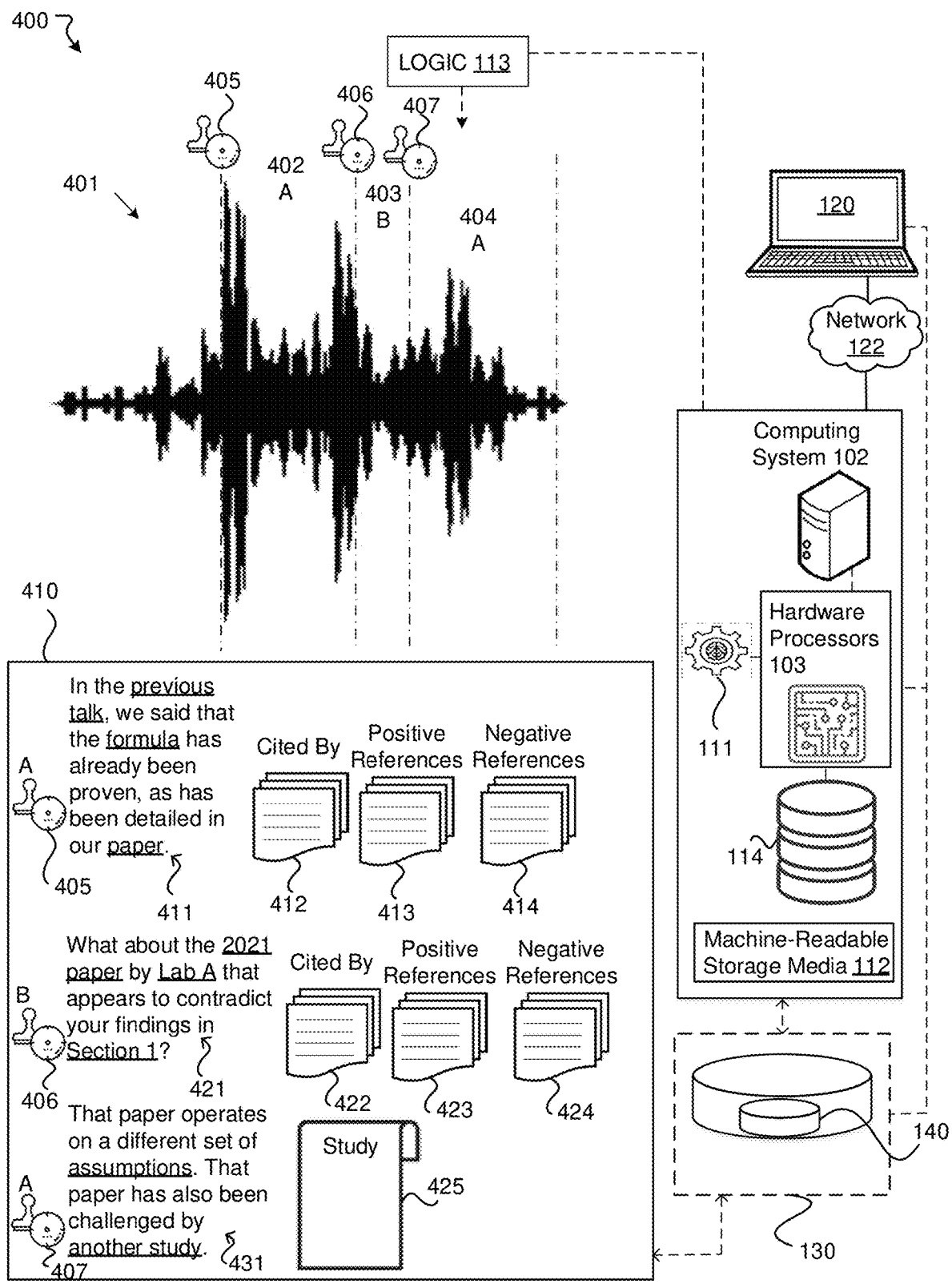
FIG. 4 illustrates, in accordance with various embodiments, an exemplary scenario in which a result from a speech recognition process is augmented due to integration with the platforms.

FIG. 4 illustrates an environment 400, depicting a scenario in which a result (e.g., any of the outputs 190, 192, 194, and 196) from a speech recognition process is augmented due to integration with the platforms 130. The environment 400 may be generated and/or visualized, for example, on a display of the computing device 120. In particular, from diarization of an audio stream or audio recording (hereinafter "audio stream") 401, entities or persons (hereinafter "persons") A and B may be identified as speakers. In particular, person A may be identified as a speaker of segment 402, having a timestamp 405, person B may be identified as a speaker of segment 403, having a timestamp 406, and person A identified as a speaker of segment 404, having a timestamp 407. The timestamps 405-407 may be implemented similar to or same as the timestamps 145-148 in FIG. 1.

The logic 113 may generate or populate a window 410 that includes transcriptions 411, 421, and 431 of the segments 402, 403, and 404, respectively. Also included may be identifications of the speakers and timestamps 405, 406, and 407 corresponding to each of the transcriptions 411, 421, and 431. For example, the transcription 411 may include references to information elsewhere within the data platforms 130. In particular, within the transcription 411, "previous talk," "formula," and "paper" may be referenced somewhere within the data platforms 130. The logic 113 may populate such references or information contained within the references, either automatically or upon receiving a selection or other indication. The logic 113 may populate a summary of the previous talk and/or an entirety of the previous talk. Additionally, the logic 113 may also open a tab or link that contains the specific formula referred to, and/or a summary of that formula. The logic 113 may further obtain or extract relevant information regarding the paper, including other resources, documents or papers 412 that have cited the paper, positive references 413 including other resources, documents or papers that support findings of the paper, and/or negative references 414 that oppose findings of the paper or otherwise are critical of the paper.

Similarly, within the transcription 421, the logic 113 may populate references to or information regarding specific entities mentioned, such as "2021 paper," "Lab A," and "Section 1." For example, the logic 113 may populate a link to the paper, a summary, and/or an entirety of the 2021 paper. Moreover, the logic 113 may conduct further analyses of relevant information regarding the 2021 paper, including other resources, documents or papers 422 that have cited the 2021 paper, positive references 423 including other resources, documents or papers that support findings of the 2021 paper, and/or negative references 424 that oppose findings of the 2021 paper or otherwise are critical of the 2021 paper. Regarding the lab A and Section 1, the logic 113 may generate or populate a link or other popup that includes information regarding lab A and section 1.

Regarding the transcription 431, the logic 113 may populate references to or information regarding specific entities mentioned, such "assumptions" and another study." For example, the logic 113 may populate a document 425 that forms the basis, has information on, or otherwise is associated with the another study. In such a manner, the integration of outputs from speech recognition with the data platforms 130 enriches understanding and value of the outputs.

Figure 5:
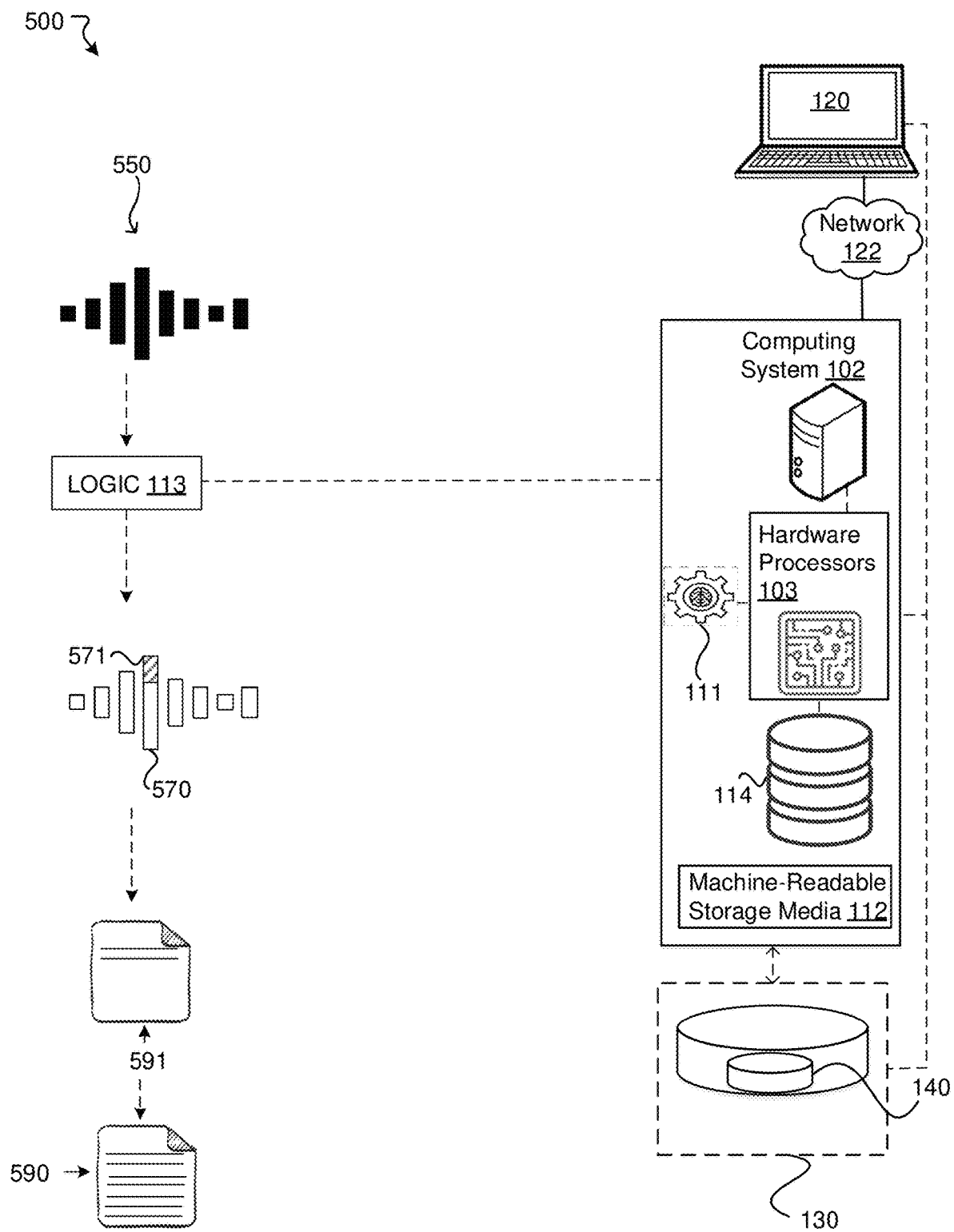
FIG. 5 illustrates, in accordance with various embodiments, a scenario of resolving multiple speakers at a same time which may occur during diarization.

FIG. 5 illustrates an environment 500, depicting a scenario of resolving multiple speakers at a same time which may occur during diarization. During meetings, an estimated 12-15% of such overlap in speakers occurs. During conversations, the extent of overlap may be larger. In particular, a portion of an audio stream segment 550 may be fed into the logic 113. The logic 113 may determine that at one time window, two speakers are speaking simultaneously. One method to resolve such an issue is an iterative process. First, the logic 113 may determine an initial estimate of probable speech of each speaker, as indicated by portions 571 and 570 being estimated to correspond to speakers A and B. The logic 113 may then fix an estimate of speaker B's speech while refining an estimate of speaker A's speech. Such refining may be conducted using algorithms such as a Viterbi algorithm. In some examples, speaker A may be identified as a predominant speaker compared to speaker B, so the refining of the estimate may be conducted initially on the predominant speaker. Next, the logic 113 may fix the refined estimate of speaker A's speech while refining the estimate of speaker B's speech. The logic 113 may continue alternating between which speaker is fixed, and which speaker's estimate is refined, until a solution converges, or an amount of change between each successive iteration becomes less than a threshold amount. A final solution may be manifested as transcriptions 591 corresponding to speaker B and 590 corresponding to speaker A.

Figure 6:
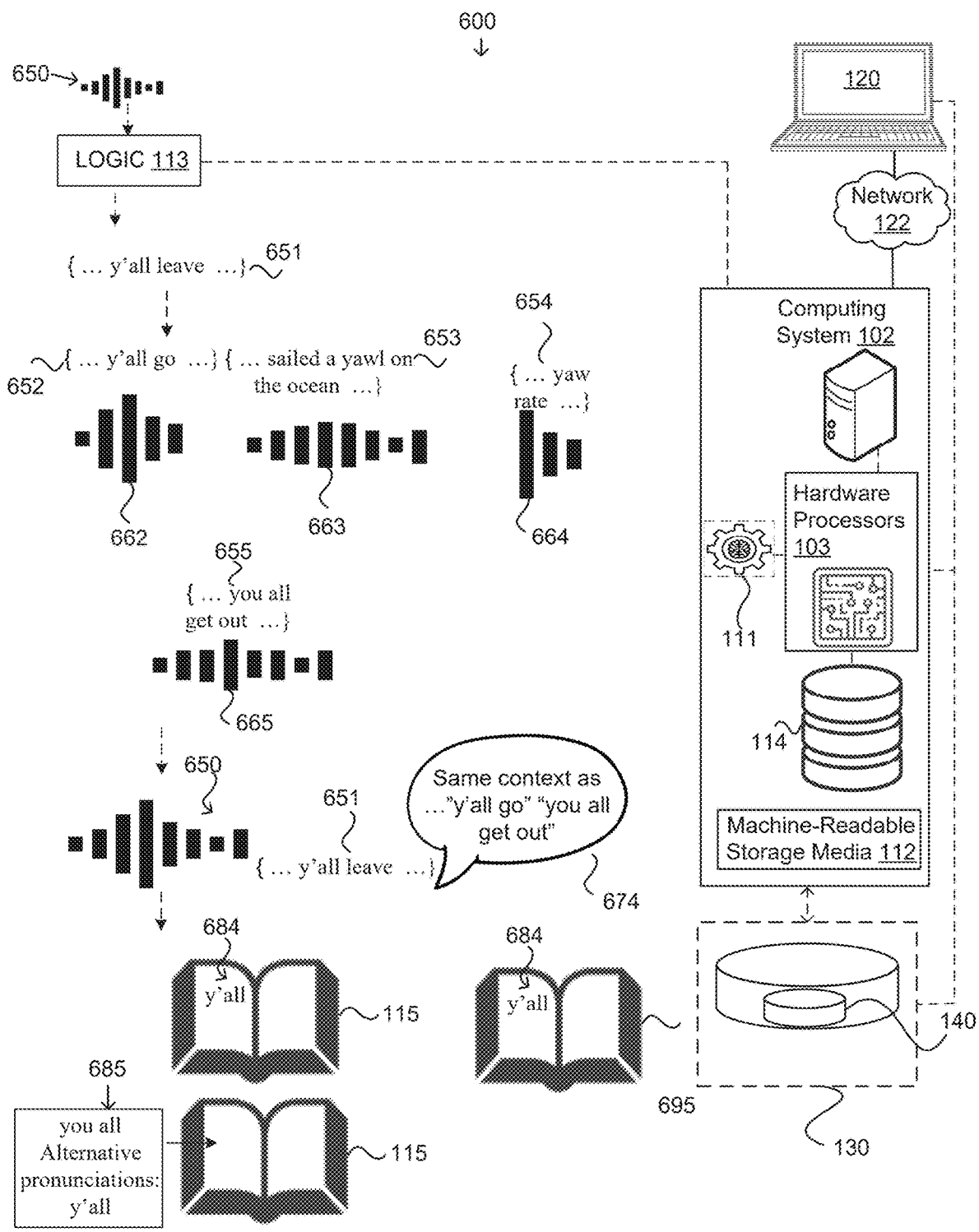
FIG. 6 illustrates, in accordance with various embodiments, a scenario of resolving or deciphering untranscribable utterances.

FIG. 6 illustrates an environment 600, depicting a scenario of resolving or deciphering untranscribable utterances. For example, untranscribable utterances may be manifested as technical jargon, codenames, local references, acronyms, slang, inside jokes, made-up words, or words that are highly specific to the context of the conversation that are not recognizable in a conventional dictionary. In FIG. 6, an audio stream 650, which may be implemented as the audio stream 150 of FIG. 1, may be received or obtained by the logic 113. The logic 113 may determine a particular phrase, group of phonemes, or a phoneme stream as an untranscribable utterance due to an inability to locate a match within the dictionary 115, and/or locate a match having at least a threshold probability or confidence level within the dictionary 115. For example, the logic 113 may determine a word "y'all" within a phrase 651 as an untranscribable utterance. The logic 113 may search for and determine similar occurrences corresponding to the untranscribable utterance, including similar occurrences of "y'all" within the audio stream 650 and/or a different audio stream. The similar occurrences may include words, phonemes, phoneme streams, or other speech constructs that have at least a threshold similarity to "y'all" and/or be spoken by either a same speaker or a speaker having characteristics, as previously referred to with respect to FIG. 1, within a threshold level of similarity. In FIG. 6, the logic 113 may determine instance 652 corresponding to "y'all go" within an audio stream 662, instance 653 "sailed a yawl on the ocean," within an audio stream 663, instance 654 "yaw rate," within an audio stream 664, and instance 655 "you all get out," within an audio stream 665. The logic 113 may output any or all of the instances 652, 653, 654, and 655. For example, the logic 113 may output an instance with a highest similarity level, or instances among highest similarity levels. The logic 113 may resolve and/or decipher the untranscribable utterance based on the outputted instance or instances. In one example, the logic 113 may obtain feedback, such as from a user of the computing device 120, regarding which ones of the instances 652, 653, 654, and 655 has or have highest similarities, and/or regarding further contextual information of or related to the untranscribable utterance. For example, the feedback may indicate that "y'all go" and "you all get out" have a same context as the "y'all leave," but that the instances 653 and 654 are dissimilar in context. The feedback may be marked by an annotation 674. Furthermore, the annotation 674 may indicate a status that the untranscribable utterance was resolved by a user. The logic 113 may incorporate a term 684, "y'all" into either the dictionary 115 and/or a separate repository 695 containing resolved untranscribable utterances separate from a conventional dictionary. In some examples, the logic 113 may incorporate the term 684 into either the dictionary 115 and/or the separate repository 695 only if a user has provided confirmation, and/or if a frequency of occurrence, measured either in number of occurrences or a rate or percentage of occurrences, of the untranscribable utterances, is greater than a threshold. Such an implementation may conserve and efficiently utilize storage space and restrict stored terms or words to only those that occur at some degree or level of frequency. Additionally or alternatively, the logic 113 may incorporate an alternative pronunciation, "y'all," corresponding to an entry "you all," which may be stored as an existing entry 685 within the dictionary 115. As a result of searching for similar phoneme streams, the logic 113 may determine and verify alternative pronunciations of an existing word or an existing phoneme stream and update the dictionary 115 to incorporate alternative pronunciations once determined and verified.

Figure 7:
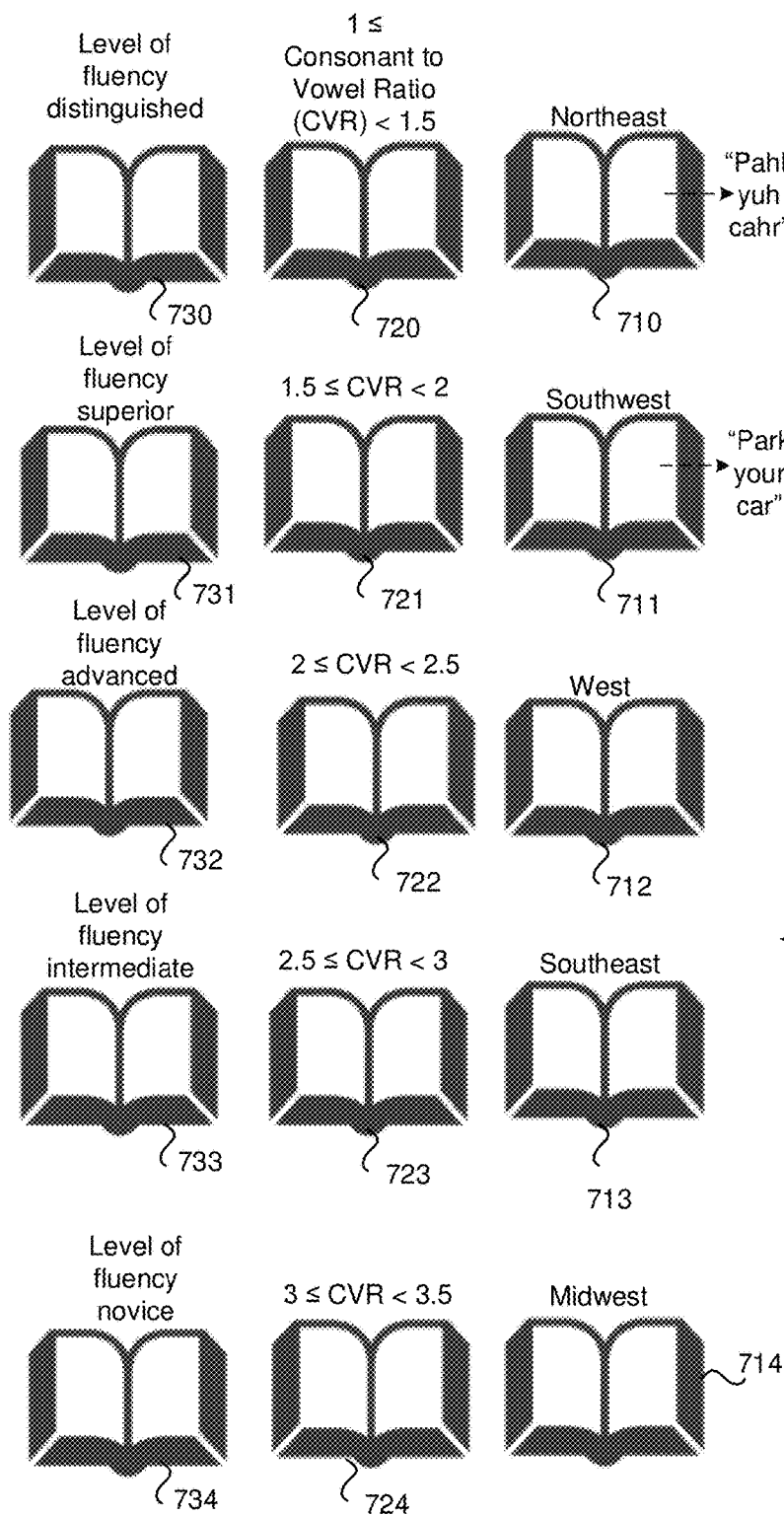
FIG. 7 illustrates, in accordance with various embodiments, a concept of using specific dictionaries, and/or repositories that store previously untranscribable utterances, based on context of the speech and/or one or more particular speakers.
Figure 7:
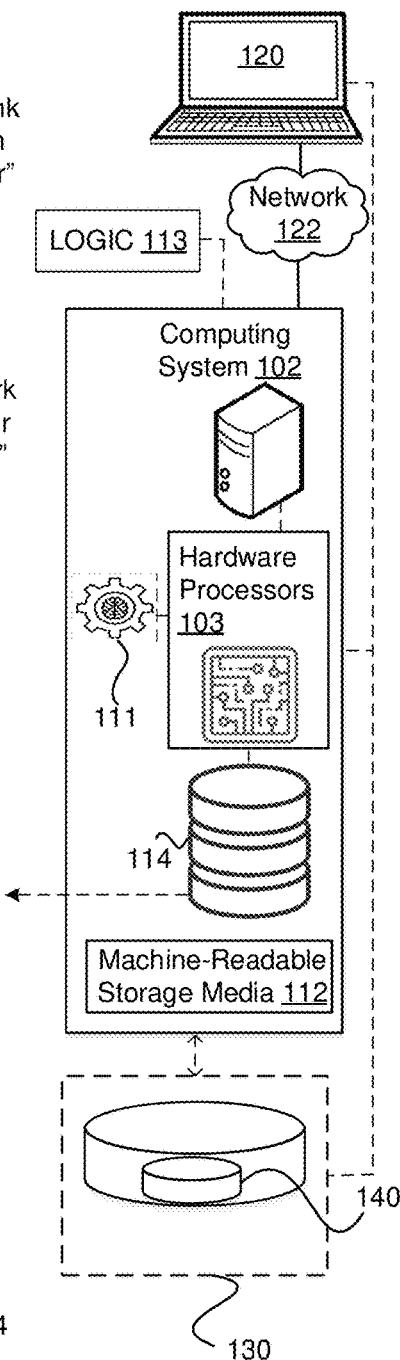

FIG. 7 illustrates a concept of using specific dictionaries, and/or repositories that store previously untranscribable utterances, based on context of the speech and/or one or more particular speakers. For example, certain speech may be specific to a particular region or location, such as a region within a country like the United States, within specific countries, and/or depending on a region or location of origin of a particular speaker. Therefore, dictionaries and/or repositories of untranscribable utterances may be categorized based on certain criteria, such as regions or locations, and/or other speaker characteristics. These characteristics may include, without limitation, any of phonetic characteristics such as patterns or sequences of speech segments, including vowels and consonants, and/or suprasegmentals including stress or accent, pitch (e.g., tone and/or intonation), variations in length, intensities, consonant-to-vowel ratios, pitch variations, pitch ranges, tempo, speaking rate, speech rate, articulation rate, level of fluency as indicated by repetitions, corrections, or hesitations, phonetic variations such as exploding certain sounds, variations between allophones of a phoneme (e.g., allophonic free variation), vowel durations, stop closure durations, voice onset times, accents, tonalities, rhythmic variations, and/or other speech patterns or characteristics.

In such a manner, the logic 113 may search for matches of phonemes, phoneme streams, or combinations thereof in one or more particular categorized dictionaries that match certain characteristics of a particular speaker, which effectively weighs speaker differences. For example, some regional idiosyncrasies in speech may not be recognized by a conventional dictionary, but may be recognized by a region-specific dictionary. Additionally, some common words have different contexts depending on region.

In FIG. 7, one categorization of dictionaries, as alluded to above, could be based on regions. These regions may be different countries or parts of the world, or different regions within the United States. As merely an example illustration, dictionaries 710, 711, 712, 713, and 714 correspond to different regions within the United States, namely, the Northeast, Southwest, West, Southeast, and Midwest, respectively. As a particular example, people in the Northeast or originating from the Northeast may pronounce a phrase "park your car" as "pahk yuh cahr," a phrase or pronunciation which may not be effectively recognized or be mistakenly recognized as a different phrase by a conventional dictionary. However, by adding such a phrase to the dictionary 710, the logic 113 would now recognize such a phrase if the speaker is from the Northeast. The dictionary 710, and the other dictionaries, may include alternative pronunciations of a particular phoneme stream, word, phrase, or other speech construct, and/or be updated to incorporate such alternative pronunciations. For example, the dictionary 710 may also include a standard pronunciation "park your car." Because the phrase "pahk yuh cahr," likely is not spoken frequently or at all in other regions, the dictionaries 711, 712, 713, and 714 may not need to store such a phrase, thereby conserving storage space and processing costs that would be incurred in searching through this phrase.

The principles described above regarding regional categories are also applicable to other categories of dictionaries. Yet other categorizations of dictionaries could be based on other speaker characteristics. One example of such is a consonant-to-vowel ratio (CVR). Some speakers may pronounce words with long vowel sounds. If the logic 113 tries to match such utterances using a conventional dictionary, then the long vowel sounds may be mistakenly interpreted as constituting separate phonemes or speech constructs rather than a single phoneme or speech construct. Therefore, by selecting a particular dictionary 720, 721, 722, 723, or 724 based on a criteria of CVRs of particular speakers, the logic 113 may mitigate or eliminate mistaken speech recognition due to certain pronunciation differences of consonants and vowels. Once again, each of the dictionaries 720, 721, 722, 723, or 724 may include alternative pronunciations such as standard pronunciations and/or be updated to incorporate such alternative pronunciations.

Another categorization basis may include a level of fluency of a speaker. For example, if a speaker is less fluent, then that speaker's speech may have more repetitions, corrections, or hesitations. If the logic 113 tries to match such utterances using a conventional dictionary, then the repetitions, corrections, or hesitations may be mistakenly interpreted as separate phonemes or constructs of speech. Therefore, by selecting a particular dictionary 730, 731, 732, 733, or 734 based on a criteria of fluency levels of particular speakers, the logic 113 may mitigate or eliminate mistaken speech recognition due to differences in fluency among speakers. Once again, each of the dictionaries 730, 731, 732, 733, or 734 may include alternative pronunciations such as standard pronunciations and/or be updated to incorporate such alternative pronunciations. In summary, the categorization of dictionaries illustrated in FIG. 7 may establish a baseline level of characteristics for each speaker.

Figure 8:
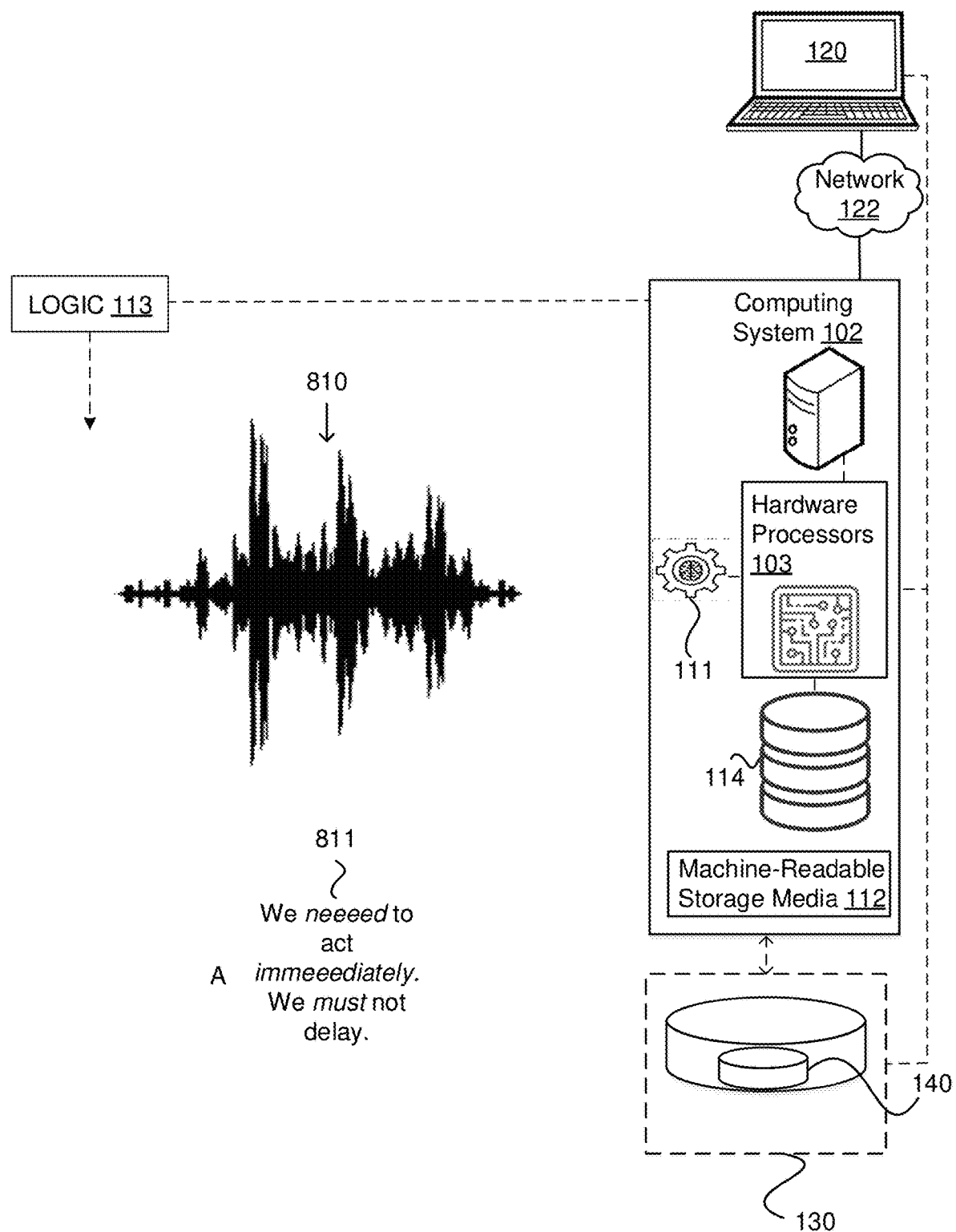
FIG. 8 illustrates, in accordance with various embodiments, a capability of detecting emphasis corresponding to certain speech constructs.

FIG. 8 illustrates a capability of detecting emphasis corresponding to certain speech constructs, which may be enabled as a result of establishing a baseline level of characteristics for each speaker, as illustrated in FIG. 7. In FIG. 8, the logic 113 may effectively detect instances in which a speaker is trying to emphasize a word or phrase.

Because the logic 113 has already established or determined a baseline level of characteristics for a speaker, the logic 113 may, based on inherent speaker characteristics, determine whether or not the speaker is trying to emphasize or deemphasize a particular word or phrase based on a level of deviation between characteristics of a currently spoken word or phrase, and a corresponding dictionary entry (e.g., within one or more particular categorized dictionaries as illustrated in FIG. 7) of that spoken word or phrase. These characteristics may include a relatively longer vowel duration, a relatively longer consonant duration, differences in pace of speech, durations of pauses in speech, among other characteristics. For example, within an audio stream 810, the logic may determine that within a transcribed phrase 811, the words "need," "immediately," and "must" were intended to be emphasized. For example, the emphasis of the words "need" and "immediately" may be evidenced by relatively longer vowel and/or consonant durations, and/or durations of pauses following the words. The emphasis of the word "must" may be evidenced by relatively longer duration of the word, changes in intonation or pitch of the word, and/or relatively longer durations of pause following the word. In such a manner, the logic 113 may extract additional contextual information beyond the words themselves, thereby further enhancing an output from speech recognition. In addition, the logic 113 may match the emphasized word with other occurrences of the word that were emphasized in a similar manner in the same conversation or a different conversation, allowing the logic 113 to search and find the other occurrences.

Figure 9:
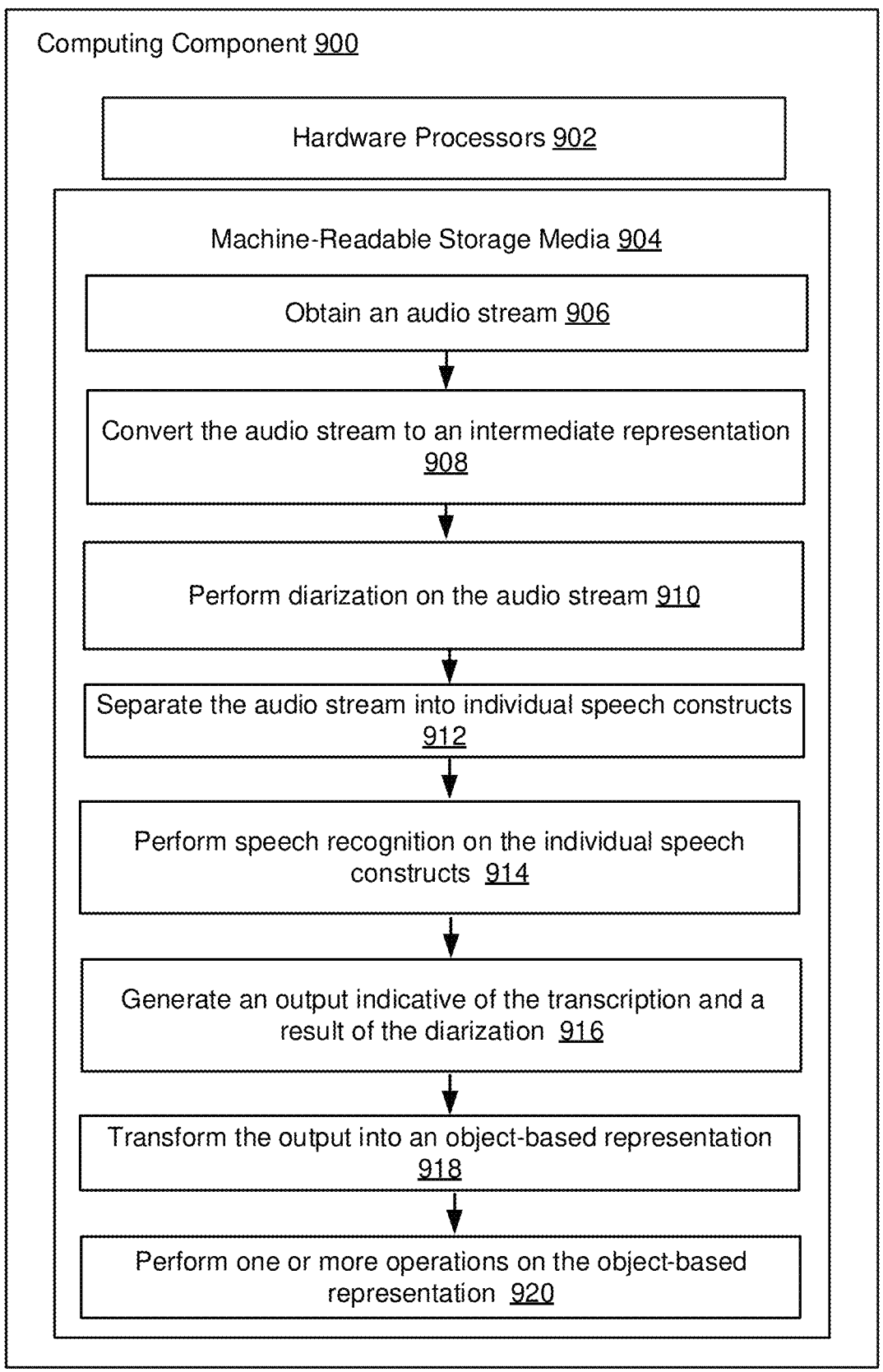
FIG. 9 illustrates a flowchart of an example method consistent with FIGS. 1-8, embodied in a computing component.

FIG. 9 illustrates a computing component 900 that includes one or more hardware processors 902 and machine-readable storage media 904 storing a set of machine-readable/machine-executable instructions that, when executed, cause the hardware processor(s) 902 to perform an illustrative method of generating a speech recognition output and augmenting the speech recognition output, among other steps. It should be appreciated that there can be additional, fewer, or alternative steps performed in similar or alternative orders, or in parallel, within the scope of the various embodiments discussed herein unless otherwise stated. The computing component 900 may be implemented as the computing system 102 of FIGS. 1-8. The hardware processors 902 may be implemented as the hardware processors 103 of FIGS. 1-8. The machine-readable storage media 904 may be implemented as the machine-readable storage media 112 of FIGS. 1-8, and may include suitable machine-readable storage media described in FIG. 10.

At step 906, the hardware processor(s) 902 may execute machine-readable/machine-executable instructions stored in the machine-readable storage media 904 to obtain an audio stream (e.g., the audio stream 141 in FIG. 1). At step 908, the hardware processor(s) 902 may execute machine-readable/machine-executable instructions stored in the machine-readable storage media 904 to convert the audio stream into an intermediate representation, such as a spectrogram (e.g., the spectrograms 160, 162, 164, and 166 of FIG. 1. The spectrograms may facilitate speech processing. At step 910, the hardware processor(s) 902 may execute machine-readable/machine-executable instructions stored in the machine-readable storage media 904 to perform diarization on the audio stream, in order to determine different speakers within the audio stream, such as speakers A, B, C, and D corresponding to the identifications 170, 172, 174, and 176 within the segments 150, 152, 154, and 156, respectively.

At step 912, the hardware processor(s) 902 may execute machine-readable/machine-executable instructions stored in the machine-readable storage media 904 to separate the audio stream into individual speech constructs, such as phonemes (e.g., the phonemes 180, 182, 184, and 186 of FIG. 1. At step 914, the hardware processor(s) 902 may execute machine-readable/machine-executable instructions stored in the machine-readable storage media 904 to perform speech recognition on the individual speech constructs by mapping each of the individual speech constructs, or consecutive individual speech constructs, to entries within a dictionary, to generate a transcription of the audio stream. For example, the hardware processor(s) 902 may map phonemes, and/or combinations of consecutive phonemes, into particular entries of the dictionary 115, and determine probabilities and/or confidence levels of matches or each of the mappings. The hardware processor(s) 902 may output a word or other speech construct within the dictionary 115 that corresponds to a highest probability and/or confidence level, for example, using an argmax operation.

At step 916, the hardware processor(s) 902 may execute machine-readable/machine-executable instructions stored in the machine-readable storage media 904 to generate an output (e.g., the outputs 190, 192, 194, and 196 indicative of the transcription and a result of the diarization. The outputs may further include timestamps (e.g., the timestamps 145, 146, 147, and 148 of FIG. 1). At step 918, the hardware processor(s) 902 may execute machine-readable/machine-executable instructions stored in the machine-readable storage media 904 to transform the output into an object-based representation as illustrated in FIG. 2. At step 920, the hardware processor(s) 902 may execute machine-readable/machine-executable instructions stored in the machine-readable storage media 904 to perform one or more operations on the object-based representation, such as those illustrated in FIGS. 3 and 4.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 10:
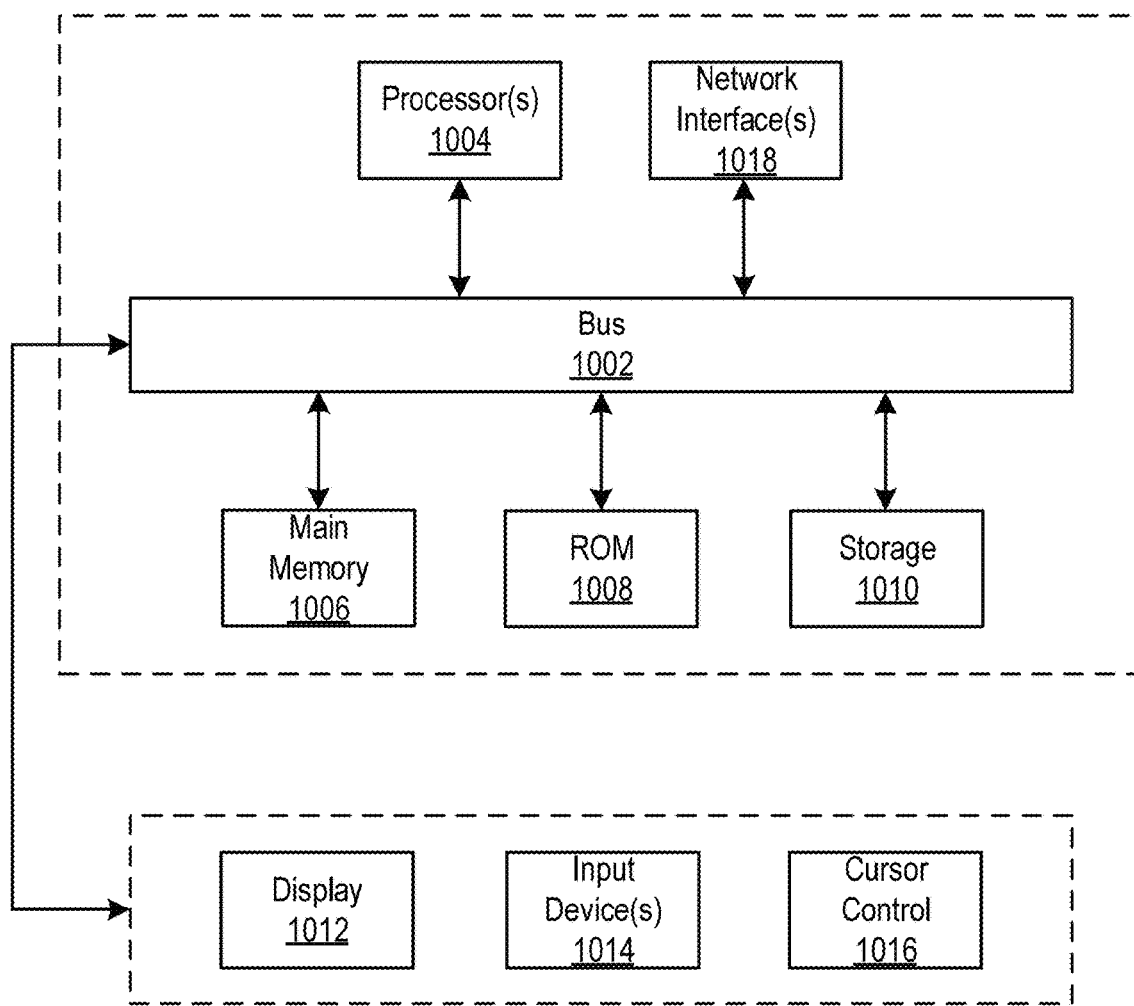
FIG. 10 illustrates a block diagram of an example computer system in which any of the embodiments described herein may be implemented.

FIG. 10 is a block diagram that illustrates a computer system 1000 upon which any of the embodiments described herein may be implemented. In some examples, the computer system 1000 may include a cloud-based or remote computing system. For example, the computer system 1000 may include a cluster of machines orchestrated as a parallel processing infrastructure. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:
1. A computing system, comprising:
one or more processors; and
memory storing instructions that, when executed by the one or more processors, cause the system to perform:
  obtaining an audio stream;
  converting the audio stream to an intermediate representation;
  performing diarization on the audio stream;
  separating the audio stream into individual speech constructs;
  performing speech recognition on the individual speech constructs by mapping each of the individual speech constructs, or consecutive individual speech constructs, to entries in a first database and a second database, wherein the first database is organized based on a first pronunciation attribute and the second database is organized based on a second pronunciation attribute, to generate a transcription of the audio stream, wherein the performing of speech recognition further comprises:
    obtaining a first category of the first pronunciation attribute to which a speaker belongs and obtaining a second category of the second pronunciation attribute to which the speaker belongs based on a comparison of degrees of matching among each speech construct or consecutive individual speech constructs and each category of the first pronunciation attribute and the second pronunciation attribute;
    establishing baseline speaker characteristics based on the first category or the second category; and
    based on the baseline speaker characteristics, identifying any speech constructs having emphasis;
    deciphering an untranscribable utterance within the audio stream by obtaining one or more first transcribable utterances within the entries having at least a threshold level of similarity with the untranscribable utterance within the audio stream or within a different audio stream;

obtaining a selection of a particular transcribable utterance from the first transcribable utterances that matches the untranscribable utterance based on an annotation associated with the particular transcribable utterance or based on an indication that the particular transcribable utterance was previously resolved;

in response to the selection, selectively mapping the untranscribable utterance to the particular transcribable utterance;

generating an output indicative of the transcription according to the any speech constructs having emphasis or the selectively mapping of the untranscribable utterance;

transforming the output into an object-based representation; and performing one or more operations on the object-based representation.

2. The computing system of claim 1, wherein the untranscribable utterance comprises slang or a pseudoword that is unrecognizable.

3. The computing system of claim 2, wherein the deciphering of the untranscribable utterance comprises:

tagging the untranscribable utterance based on the transcribable utterance.

4. The computing system of claim 3, wherein the characteristics comprise suprasegmentals, the suprasegmentals comprising a stress, an accent, or a pitch.

5. The computing system of claim 1, wherein the performing of the one or more operations comprises retrieving additional information stored in a data platform regarding an entity within the output; and rendering a visualization of the additional information.

6. The computing system of claim 1, wherein the performing of the one or more operations comprises performing an analysis regarding an entity within the output from additional information stored in a data platform linked to or referencing the entity.

7. The computing system of claim 1, wherein the diarization is performed by a machine learning component based on any of variations in length, intensities, consonant-to-vowel ratios, pitch variations, pitch ranges, tempos, articulation rates, and levels of fluency within particular segments of the audio stream.

8. The computing system of claim 1, wherein the first pronunciation attribute comprises any of a level of fluency, a phonetic characteristic, or a region of origin of the speaker.

9. The computing system of claim 1, wherein the performing of the one or more operations comprises:

ingesting the object-based representation into a data platform; and inferring one or more additional links between an entity within the output and one or more additional entities for which information is stored in the data platform.

10. The computing system of claim 1, wherein the performing of the one or more operations comprises:

receiving a query regarding an entity within the output;

retrieving one or more instances of an utterance, within a data platform connected to the computing system, that references the entity and the query; and generating a response based on the one or more instances of the utterance.

11. The computing system of claim 1, wherein the speaker comprises a first speaker, and the instructions further cause the computing system to perform:

determining that the first speaker and a second speaker are speaking at a same time;

iteratively resolving between the first speaker and the second speaker, wherein the iterative resolving comprises:

refining a first estimate of a probable speech of the first speaker and fixing a second estimate of a probable speech of the second speaker;

refining the second estimate of the probable speech of the second speaker and fixing the first estimate of the probable speech of the first speaker;

continuing to refine the first estimate and the second estimate until an amount of change between each successive iteration becomes less than a threshold amount.

12. The computing system of claim 1, wherein the instructions further cause the computing system to perform:

storing the untranscribable utterance as an additional entry in the first database, the second database, or a different database, wherein the additional entry is categorized based on consonant-to-vowel ratios and stop closure durations.

13. The computing system of claim 1, wherein the first pronunciation attribute is based on particular regional dialects or accents.

14. The computing system of claim 1, wherein the second pronunciation attribute is based on ranges of vowel to consonant ratios.

15. A computer-implemented method of a computing system, the computer-implemented method comprising:

obtaining an audio stream;

converting the audio stream to an intermediate representation;

performing diarization on the audio stream;

separating the audio stream into individual speech constructs;

performing speech recognition on the individual speech constructs by mapping each of the individual speech constructs, or consecutive individual speech constructs, to entries in a first database and a second database, wherein the first database is organized based on a first pronunciation attribute and the second database is organized based on a second pronunciation attribute, to generate a transcription of the audio stream, wherein the performing of speech recognition further comprises:

obtaining a first category of the first pronunciation attribute to which a speaker belongs and obtaining a second category of the second pronunciation attribute to which the speaker belongs based on a comparison of degrees of matching among each speech construct or consecutive individual speech constructs and each category of the first pronunciation attribute and the second pronunciation attribute;

establishing baseline speaker characteristics based on the first category or the second category; and based on the baseline speaker characteristics, identifying any speech constructs having emphasis;

deciphering an untranscribable utterance within the audio stream by obtaining one or more first transcribable utterances within the entries having at least a threshold level of similarity with the untranscribable utterance within the audio stream or within a different audio stream;

obtaining a selection of a particular transcribable utterance from the first transcribable utterances that matches the untranscribable utterance based on an annotation associated with the particular transcribable utterance or based on an indication that the particular transcribable utterance was previously resolved;

in response to the selection, selectively mapping the untranscribable utterance to the particular transcribable utterance while leaving any unselected transcribable utterances unmapped;

generating an output indicative of the transcription according to the any speech constructs having emphasis or the selectively mapping of the untranscribable utterance;

transforming the output into an object-based representation; and performing one or more operations on the object-based representation.

16. The computer-implemented method of claim 15, wherein the untranscribable utterance comprises slang or a pseudoword that is unrecognizable.

17. The computer-implemented method of claim 15, wherein the performing of the one or more operations comprises performing an analysis regarding an entity within the output from additional information stored in a data platform linked to or referencing the entity.

18. The computer-implemented method of claim 15, wherein the diarization is performed by a machine learning component based on any of variations in length, intensities, consonant-to-vowel ratios, pitch variations, pitch ranges, tempos, articulation rates, and levels of fluency within particular segments of the audio stream.

19. The computer-implemented method of claim 15, wherein the performing of the one or more operations comprises:

receiving a query regarding an entity within the output;

retrieving one or more instances of an utterance, within a data platform connected to the computing system, that references the entity and the query; and generating a response based on the one or more instances of the utterance.

* * * * *